United States Patent [19]

Li et al.

[11] Patent Number: 4,633,309

[45] Date of Patent: Dec. 30, 1986

[54] CABLE TELEVISION MASTER/SLAVE DECODER CONTROL

[75] Inventors: Tony C. Li, Rancho Bernardo; Graham S. Stubbs, Poway, both of Calif.

[73] Assignee: Oak Industries Inc., Rancho Bernardo, Calif.

[21] Appl. No.: 731,564

[22] Filed: May 6, 1985

[51] Int. Cl.[4] .............................................. H04N 7/167
[52] U.S. Cl. ...................................... 358/122; 358/86; 358/114
[58] Field of Search .................. 358/114, 122, 123, 86

[56] References Cited

U.S. PATENT DOCUMENTS

| | | | |
|---|---|---|---|
| 4,450,481 | 5/1984 | Dickinson | 358/114 |
| 4,475,123 | 10/1984 | Dumbauld et al. | 358/122 |
| 4,520,508 | 5/1985 | Reichert | 358/86 |
| 4,530,008 | 7/1985 | McVoy | 358/122 |
| 4,574,305 | 3/1986 | Campbell et al. | 358/86 |

Primary Examiner—Stephen C. Buczinski
Attorney, Agent, or Firm—Kinzer, Plyer, Dorn & McEachran

[57] ABSTRACT

A method of controlling the operation of slave decoders in a cable television distribution system having a central control computer; in which each subscriber location having a slave decoder also has a master decoder; in which there is a control message connection between each master decoder and its associated slave decoder(s); and in which the central control computer can individually address each master decoder and each slave decoder. The method includes the steps of transmitting control messages for the slave decoders at the control message frequency for the master decoders. In response thereto, each master decoder will retransmit the control message to its associated slave decoders. Periodically, the central control computer sends deauthorize messages addressed to all slave decoders as a group; however, the deauthorization messages are preceded by an inhibit message addressed to all master decoders, thereby preventing the retransmission of the slave decoder deauthorization message to all slave decoders which are connected to a master decoder.

11 Claims, 4 Drawing Figures

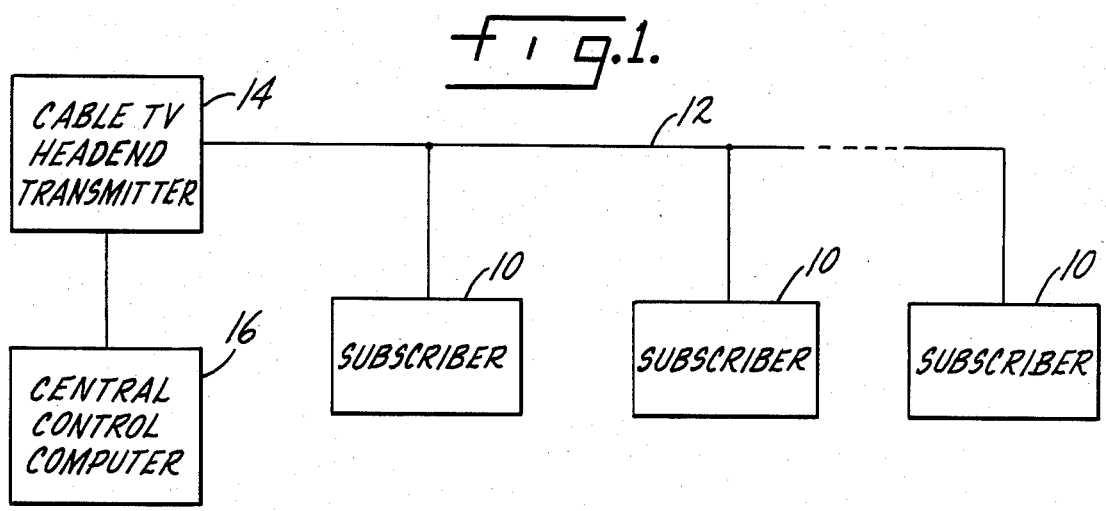
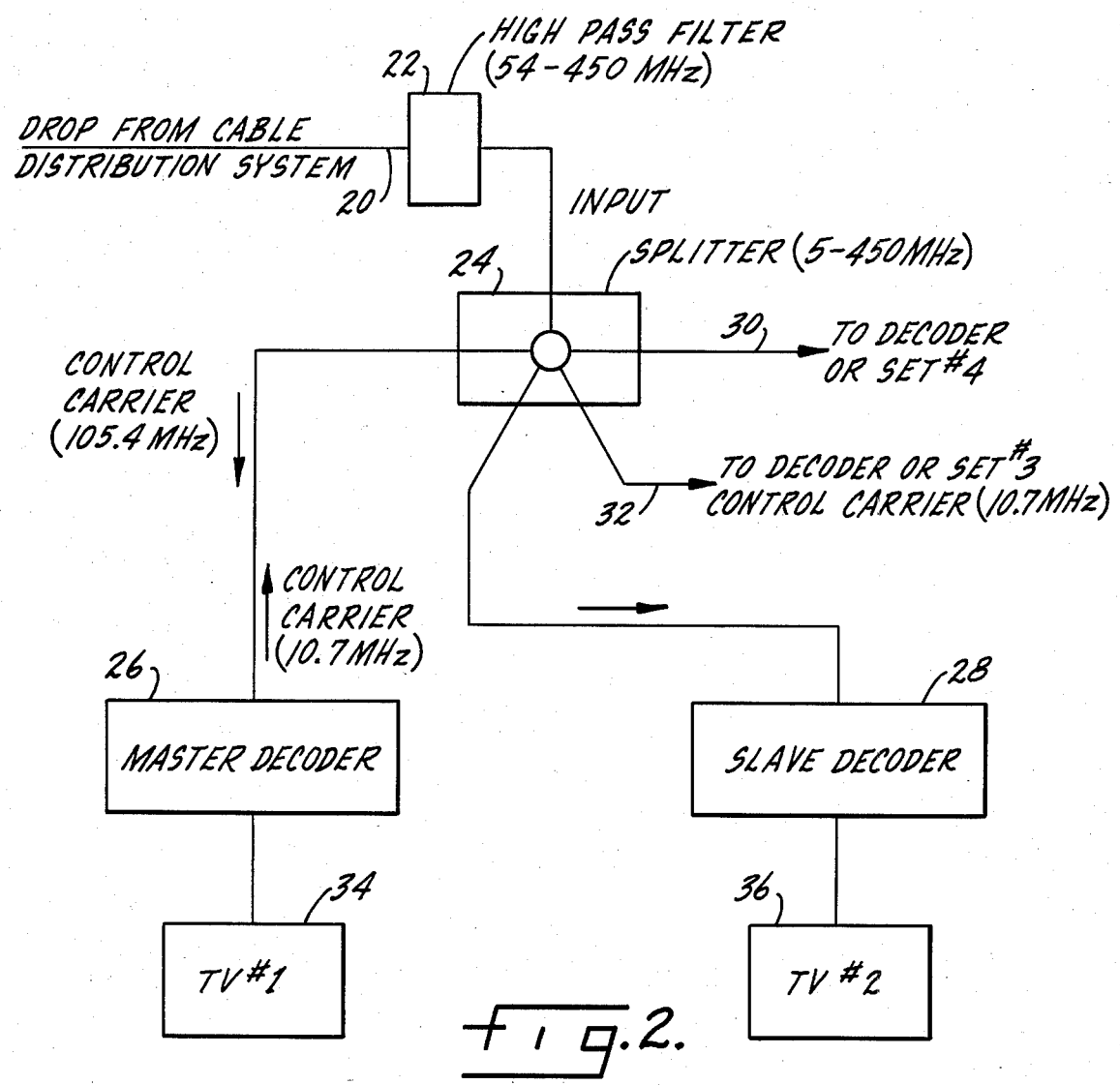

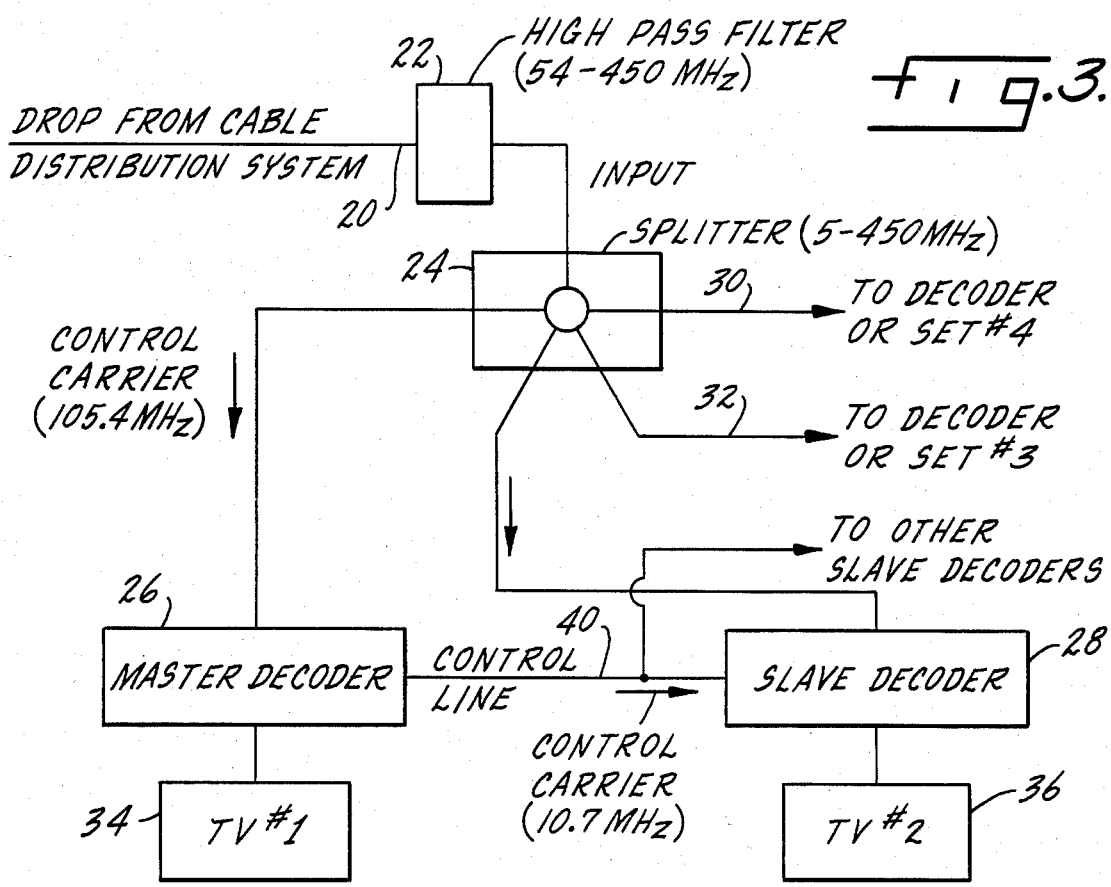
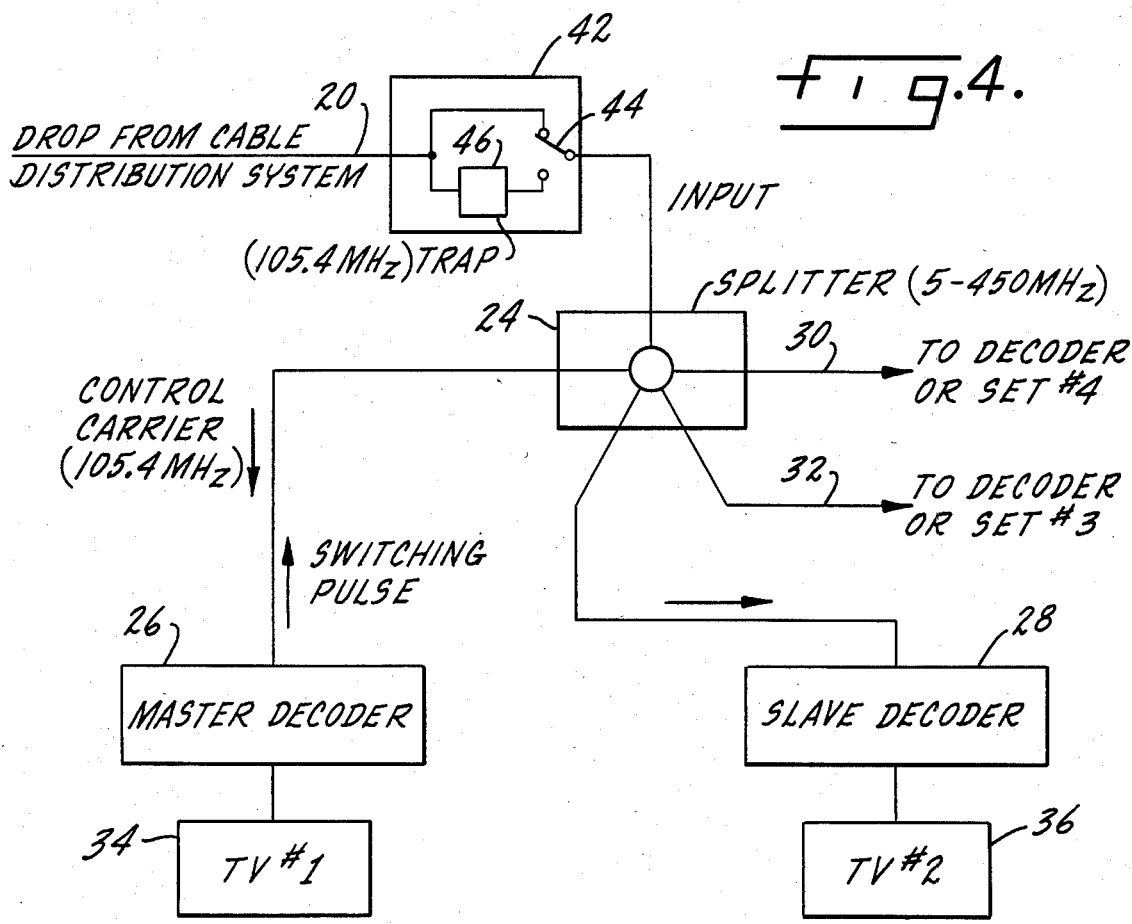

012
CABLE TELEVISION MASTER/SLAVE DECODER CONTROL

SUMMARY OF THE INVENTION

The present invention relates to the operation of cable television systems and in particular to a system for insuring that secondary or so-called "slave" decoders are only used in conjunction with their associated primary or "master" decoder.

A primary purpose of the invention is a method of operating a cable television system in which each control message for a slave decoder is retransmitted by its associated master decoder.

Another purpose is a cable television system of the type described providing for a control of all slave decoders through their associated master decoders.

Another purpose is a method of operating a cable television system preventing the unauthorized use of secondary or slave decoders with other than their associated primary or master decoders.

Another purpose is a method of operating a cable television system in which control over slave decoders is maintained through the associated master decoders by the sending of periodic deauthorization messages to the slave decoders, which messages are preceded by an inhibit message to the master decoders.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a portion of a cable television system, FIG. 2 is a schematic illustration, in block diagram form, of the components at a cable television subscriber location, FIG. 3 is a schematic illustration, in block diagram form, of a variation of the master/slave decoder connection at a subscriber location, and FIG. 4 is a schematic illustration, in block diagram form, of a further form of the invention.

DESCRIPTION OF THE PREFERRED EMBODIMENT

In the operation of cable television systems, conventionally an individual subscriber may have more than one television receiver which he desires to be connected to the cable television system and each of those receivers will require an individual decoder if each receiver is to have full access to the programming on the cable system. Frequently cable television operators provide pay television service to a second decoder, a so-called secondary or "slave" decoder, at a significantly lower subscription rate than that for use of the primary or master decoder. Many cable television system operators are concerned that subscribers will pay the lower rate for one or more slave TV decoders and then rent such decoders to other subscribers at a rate significantly below that charged by the system operator. The result is less revenue for the system operator.

The present invention provides a system of control whereby slave decoders must be operated through their master decoders; otherwise they will be disabled from the system head end.

FIG. 1 illustrates a conventional cable television system in which there are a plurality of subscribers indicated at 10, each connected to a cable distribution system 12. The cable television headend transmitter is indicated at 14 and there will be a central control computer 16 which is connected to the distribution system 12 and is used, as is conventional in state-of-the-art cable television systems, to individually control the decoders at each subscriber. In present day cable television operation, subscribers select various tiers of service and depending upon their selection and their willingness to pay, their individual decoders will be controlled from the central control computer so that they will only receive the pay television service for which they have agreed to pay and for which they continue to pay.

FIG. 2 illustrates the components at a subscriber location 10 in which there are one or more slave decoders associated with a master decoder. The drop from the cable distribution system is indicated at 20 and it is connected to a high pass filter 22 which will pass signals between 54 and 450 MHz. A splitter 24 is connected to filter 22 and the splitter will pass television signals between 5 and 450 MHz. Connected to the splitter is a master decoder 26 and a slave decoder 28. There are additional lines extending out from the splitter, indicated at 30 and 32, which may be used in the event there is more than one slave decoder. The present invention is useful with a single master decoder and a plurality of slave decoders at an individual subscriber location. The particular type of decoder may of course vary widely and one such system which is satisfactory is the cable television coding system utilized by Oak Industries Inc. and disclosed in U.S. Pat. Nos. 4,336,553, 4,340,906 and 4,353,088. Each of the decoders will be connected to a television receiver, with the receivers being indicated at 34 and 36.

In a typical cable television control system, the central control computer will periodically send messages to each of the decoders to control the operation of the decoder and thus the pay television programming viewable at an individual subscriber and its individual receivers. U.S. Pat. Nos. 4,112,464 and 4,323,922 show such control systems. In the present instance, the central control computer can individually address and individually control each master decoder 26 and each slave decoder 28. Control messages are sent from the central control computer 16 at a frequency of 105.4 MHz. These signals are only receivable at each master decoder, as each slave decoder, although originally identical to a master decoder, is programmed, once installed, to only receive control messages at a different frequency. Each master decoder will retransmit any message to an associated slave decoder at a different frequency, in this case 10.7 MHz. Thus, a control message destined for slave decoder 28 will be transmitted on the cable system at a frequency of 105.4 MHz and, accordingly, will be received at master decoder 26. This same message will be immediately retransmitted from master decoder 26 to the splitter and then from the splitter to slave decoder 28. The splitter will pass the 10.7 MHz control message from the master decoder, but this control message will not pass high pass filter 22 and will be reflected by the high pass filter back to the splitter and then from the splitter through the other ports thereof to the individual slave decoders. Thus, in a legitimate master/slave decoder location, the slave decoder cannot receive control messages other than those which are retransmitted from its master decoder.

In the event that an unauthorized slave decoder is connected to the cable system, and it is connected to receive a control channel message at 105.4 MHz, for example by a frequency converter, the system is arranged so that such an unauthorized slave decoder will be decommissioned or deauthorized.

Periodically, the central control computer 16 will send deauthorization messages addressed to all slave decoders as a group. These signals are sent at the control message frequency of 105.4 MHz. However, preceding the slave deauthorization message, the central control computer will send an inhibit command to all master decoders, again as a group. If a slave decoder is authorized and is therefore connected to its master decoder through a control message channel, e.g. the splitter shown herein, the inhibit command sent to the master decoder, will prevent the subsequent deauthorization message from being sent to its slave. Thus, the deauthorize signal for all slave decoders will not be retransmitted by a master decoder since it has previously been inhibited from retransmitting for a time period sufficient to avoid the retransmission of the deauthorize message to its associated slave.

In a modification of the invention, the receipt of the inhibit command at the master decoder will cause it to send an inhibit message or pulse to the slave decoders which will prevent the slave decoders from reacting to the deauthorization message.

Those slave decoders which are connected to the cable system in an unauthorized manner, again through a frequency converter as an example, will receive the deauthorization message and thus will be deauthorized from then on. Only those slave decoders which are connected to a legitimate master decoder and which do not receive the deauthorization message because of the previously sent inhibit message to the master, will continue to function as legitimate slave decoders.

The master and slave decoders are manufactured identically and shipped as master decoders. At installation the decoders installed in secondary or slave set locations will be reprogrammed from the central control computer to function as slave decoders and will thereafter only receive authorization messages or control messages at the retransmission frequency, in this case 10.7 MHz.

FIG. 3 illustrates a variant form of the invention in which the control messages, again at a frequency of 10.7 MHz, are not transmitted back to the splitter from the master decoder and then to the individual slave decoders, but rather are transmitted by a separate control line from the master decoder to each of the slave decoders. In FIG. 3, the same numbers have been applied as in FIG. 2 and the only addition is control line 40, which is shown as being connected from master decoder 26 to slave decoder 28 with an open connection to other slave decoders which may be utilized at a particular subscriber location. The difference between the FIGS. 2 and 3 embodiments is that the FIG. 2 embodiment transmits the control carrier at a 10.7 MHz frequency back to the splitter and from the splitter to the individual slave decoders, whereas, in the FIG. 3 embodiment the control message from the master decoder to each of the slave decoders is sent over a direct line.

The invention should not be limited to the use of a 10.7 MHz control message from the master decoders to its associated slave decoder. For example, the master may send out a DC pulse, either by the RF cable embodiment of FIG. 2 or by the direct connection of FIG. 3, to each of the individual and associated slave decoders, which DC pulse will have the effect of inhibiting any further message reception at the slave decoders. There are various forms of controlling and inhibiting each of the slave decoders and described herein are two such variations, specifically a 10.7 MHz control message and a DC pulse which has the effect of inhibiting the receipt of further messages by the slave decoder.

In the embodiment of FIG. 4, where again like numbers have been given to like parts, the high pass filter 22 has been replaced by a switched control channel filter 42, which includes a switch 44 and a 105.4 MHz trap 46. Switch 44 either bypasses the trap or connects the cable drop through the trap to splitter 24.

In operation, the normal position of switch 44 will be to bypass trap 46, in which case all control messages from the cable system head end will be sent to the splitter and from the splitter to the master and slave decoders, as described above. In the event that there will be a deauthorization message to each of the slave decoders, that message again will be preceded by an inhibit message to the master decoders. The result of each master decoder receiving an inhibit message is to cause the master to transmit a switching pulse back through the RF line to splitter 24 and from the splitter to switched control channel filter 42. The switching pulse will cause switch 44 to move opposite the position shown, thereby connecting the trap 46 between the cable drop and the splitter. This has the effect of interrupting the deauthorization message which follows the inhibit message, with the interruption preventing those slave decoders connected to the master from receiving the deauthorization message.

The trap only affects control messages at the frequency of 105.4 MHz which is the frequency in the example herein used by the cable system head end to control the master and slave decoders. Thus, the trap is only effective at the control message frequency and then only when the master decoder connects the trap in circuit so as to inhibit a subsequently-transmitted deauthorization messages from reaching the slave. An ultimate lower cost method would be to use a gated attenuator instead of the trap controlled by the switching pulse to attenuate the RF cable signal during the inhibit mode.

Whereas the preferred form of the invention has been shown and described herein, it should be realized that there may be many modifications, substitutions and alterations thereto.

The embodiments of the invention in which an exclusive property or privilege is claimed are defined as follows:

1. A method of controlling the operation of slave decoders in a cable TV distribution system having a central control computer; in which each subscriber location having a slave decoder also has a master decoder; in which there is a control message connection between each master decoder and its associated slave decoder(s); and in which the central control computer can address each master decoder and each slave decoder, including the step of periodically sending from the central control computer a deauthorization message for all slave decoders, which message is preceded by an inhibit message directed to all master decoders, which inhibit message prevents the receipt of the deauthorize message by all slave decoders which are connected, by a control message connection, with a master decoder.

2. The method of claim 1 further characterized by and including the step of transmitting control messages for the slave decoders at the control message frequency for the master decoders; in response thereto retransmitting, from the master decoder, through the control message connection, the control message for its associated slave decoder(s).

3. The method of claim 2 further characterized in that the control message from a master decoder to its associated slave decoder(s) is at a frequency different than the control message frequency for the master decoders.

4. The method of claim 2 further characterized by and including the step of preventing a control message from a master decoder to its associated slave decoder(s) from passing into the cable television distribution system.

5. The method of claim 1 further characterized in that each master/slave control message connection utilizes the splitter which connects all master and slave decoders with the cable television distribution system.

6. The method of claim 1 further characterized in that each master/slave control message connection utilizes a separate connection between each master decoder and its associated slave decoder(s).

7. A method of controlling the operation of slave decoders in a cable TV distribution system having a central control computer; in which each subscriber location having a slave decoder also has a master decoder; and in which the central control computer can address each master decoder and each slave decoder, including the step of periodically sending from the central control computer a deauthorization message for all slave decoders, which message is preceded by an inhibit message directed to all master decoders, which inhibit message prevents the receipt of the deauthorized message by all slave decoders which are associated with a master decoder.

8. The method of claim 7 further characterized in that a master decoder, upon receipt of an inhibit message, uses a control channel filter to interrupt a subsequent slave decoder deauthorization message.

9. The method of claim 7 further characterized in that a master decoder, upon receipt of an inhibit message, interrupts a subsequent slave decoder deauthorization message.

10. The method of claim 7 further characterized in that a master decoder, upon receipt of an inhibit message, prevents, a slave decoder from receiving a subsequent slave decoder deauthorization message.

11. The method of claim 7 further characterized in that a slave decoder inhibits the reaction to a deauthorization message for all slave decoders upon the receipt of an inhibit message from its associated master decoder.

* * * * *